United States Patent Office 3,804,865
Patented Apr. 16, 1974

3,804,865
METHOD OF PREPARING SELF-CONDENSATION PRODUCTS OF ALKYLPHENOLS
Thomas F. Rutledge, Wilmington, Del., assignor to ICI America Inc., Wilmington, Del.
No Drawing. Filed Mar. 23, 1973, Ser. No. 344,223
Int. Cl. C07c 43/20, 49/64
U.S. Cl. 260—396 N        17 Claims

ABSTRACT OF THE DISCLOSURE

An improved method of preparing condensation products, such as diphenoquinones and polyphenoxy ethers, from alkylphenols is disclosed. The method involves contacting a solution of an alkylphenol, in the presence of a palladium catalyst and an alkaline material selected from the group consisting of alkali metal hydroxides, alkali metal carbonates and alkali metal bicarbonates, with oxygen or an oxygen-containing gas.

BACKGROUND OF THE INVENTION

Field of the invention

The present invention relates generally to an improved method of preparing self-condensation products, such as diphenoquinones and polyphenoxy ethers, from alkylphenols. More particularly, the invention relates to a method of preparing condensation products by contacting a solution of an alkylphenol with oxygen or an oxygen-containing gas in the presence of a palladium catalyst and an alkaline material selected from the group consisting of alkali metal hydroxides, alkali metal carbonates and alkali metal bicarbonates.

Description of the prior art

It is now well known that alkyl-substituted phenols can be oxidized to yield self-condensation products, including diphenoquinones and polyphenoxy ethers.

In preparing these materials, a variety of catalysts have previously been suggested including several noble metal catalysts. The use of platinum catalysts in phenol oxidation was reported by Lutz et al. in 34 Journal of Organic Chemistry. No. 11, 3456 (1969). The use of noble metal catalysts was also disclosed in U.S. Pat. 3,555,502, issued to Mitsubishi. The Mitsubishi patent discloses the preparation of polyphenoxy ethers and diphenoquinones by an oxidative coupling reaction which is carried out by contacting a solution of a phenol with oxygen in the presence of a catalyst selected from the group consisting of ruthenium, rhodium, palladium, iridium, and platinum.

It has now been found, in accordance with the present invention, that, when palladium is employed, the amount of noble metal catalyst required can be reduced or the efficiency of the reaction improved by carrying out the reaction in the presence of an alkaline material as hereinafter defined. An additional advantage of the process of the present invention is the ability to utilize more concentrated alkylphenol solutions than could be employed in the prior art processes.

SUMMARY OF THE INVENTION

In accordance with the present invention, self-condensation products such as diphenoquinones and polyphenoxy ethers are prepared by contacting a solution of an alkylphenol with oxygen or an oxygen-containing gas in the presence of a palladium catalyst and an alkaline material selected from the group consisting of alkali metal hydroxides, alkali metal carbonates and alkali metal bicarbonates.

DESCRIPTION OF THE PREFERRED EMBODIMENTS

The self-condensation products of alkylphenols prepared in accordance with the present invention can be categorized as either diphenoquinones or polyphenoxy ethers. The diphenoquinones are prepared by a carbon-carbon coupling of the alkylphenol in accordance with the following general reaction:

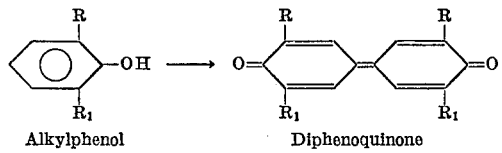

Alkylphenol         Diphenoquinone wherein R and $R_1$ are alkyl groups of from 1 to 5 carbon atoms. Similarly, polyphenoxy ethers are prepared by a carbon-oxygen coupling in accordance with the following general reaction:

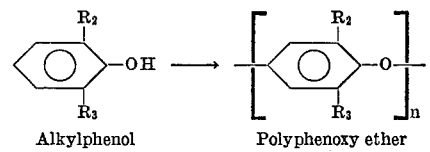

Alkylphenol         Polyphenoxy ether wherein $R_2$ is an alkyl group of from 1 to 5 carbon atoms, $R_3$ may be either an alkyl group of from 1 to 5 carbon atoms or hydrogen, and $n$ is an integer.

In accordance with the present invention, these self-condensation products are prepared by introducing oxygen into a reaction mixture comprising an alkylphenol, a solvent, a palladium catalyst, and an alkaline material. Each of these components is described in detail below.

Alkylphenol

The alkylphenols which may be employed in carrying out the present invention include both the 2,6-dialkylphenols and the monoalkylphenols. When a 2,6-dialkyl material is employed, either a diphenoquinone or polyphenoxy ether may be prepared by the improved process of the present invention. The dialkylphenols useful in carrying out this invention include any alkylphenol having alkyl groups in both the 2 and 6 positions. Disubstituted alkylphenols which may be employed include, for example, 2,6-xylenol, 2-methyl-6-butyl phenol, 2,6-diisobutyl phenol, 2-octyl-6-methyl phenol, 2-isobutyl-6-dodecyl phenol, 2-ethyl-6-methyl phenol, 2,6-didecyl phenol, 2,6 - ditertiary - amyl phenol, and 2,6 - ditertiary - butyl phenol.

When a monoalkylphenol is employed, the improved process of the present invention produces only polyphenoxy ethers having a low average molecular weight. As used herein, the term low molecular weight polyphenoxy ethers is intended to refer to those materials which have an average molecular weight of less than about 2,800 when prepared from a dialkylphenol and less than about 1,000 when prepared from a monoalkylphenol. Monoalkylphenols which may be employed in accordance with the present invention are the ortho-substituted phenols including, for example, ortho-methyl phenol, ortho-propyl phenol, and ortho-tertiary-butyl phenol.

The preferred monoalkyl and dialkyl phenols for use in the present invention are those in which the alkyl groups contain from 1 to about 5 carbon atoms.

Solvent

In carrying out the improved process of the present invention, the alkylphenol is first dissolved in a suitable solvent. Representative organic solvents in which the alkylphenols may be dissolved are the aromatic hydrocarbons, including benzene, toluene, ethyl benzene, xylene, cumene, mesitylene, and the like; the nitrated aromatic hydrocarbons, including nitrobenzene, dinitrobenzene, nitrotoluene, and the like; alicyclic hydrocarbons, including cycloheptane cyclohexane, and the like; tertiary-butyl alcohol; tertiary-amyl alcohol; dimethylformamide; dimethylsulfoxide; tetrahydrofuran; dioxane; ketones; and esters of lower aliphatic acids. Of these, it is especially preferred to employ the aromatic hydrocarbons.

The amount of solvent employed has not been found to be narrowly critical to the preparation of self-condensation products in accordance with the present invention. However, the amount of solvent employed should be sufficient to dissolve the alkylphenol being reacted. For most solvent-alkylphenol mixtures, about 2 ml. of solvent per gram of alkylphenol is sufficient to dissolve the phenol.

When a diphenoquinone is prepared, water should also be included as an additional solvent in the reaction mixture. In this case, preferred results have been achieved when from about 200 ml. to about 1,400 ml. of water are added per liter of organic solvent. If either less than or more than this amount of water is utilized, optimum yields of diphenoquinone are not generally achieved.

When polyphenoxy ethers are prepared in accordance with the present invention, it has been found that the use of an excess of solvent or the addition of water to the reaction mixture tends to produce ethers of relatively low molecular weights. Thus, if it is desired to produce a product having the highest possible molecular weight, only the minimum amount of solvent and no water should be included in the reaction mixture. The actual amount of solvent, in this situation, may vary depending upon the alkylphenol employed, type of stirring, etc.

Catalyst

According to the process of the present invention, the oxidation reaction is carried out in the presence of a palladium catalyst. Although a variety of noble metal catalysts have been employed or suggested in the prior art, it should be emphasized that the improved results of the present invention are achievable only when a palladium catalyst is used. The palladium may be carried on a suitable carrier or mixed with one of the other materials employed in the reaction. If a carrier is employed, activated carbon is preferred. Preferred results have been achieved with a palladium-on-carbon catalyst in which the amount of active palladium is equal to from about 1% to about 10% by weight based on the weight of carbon present. The amount of catalyst may be varied over a wide range depending upon the product to be produced and the other reaction conditions. The amount of palladium catalyst employed has not been found to be narrowly critical to the production of condensation products in accordance with the present invention.

Optimum yields of diphenoquinones have generally been achieved when the amount of palladium included in the reaction mixture was equal to from about 0.02% to about 0.5% by weight based on the weight of alkylphenol employed. However, either more or less than this amount of catalyst may be utilized. If more catalyst is employed, the rate of reaction is increased but the conversion to diphenoquinone is reduced. If less catalyst is used, the rate of reaction is slower and the yield is also reduced.

When polyphenoxy ethers are the desired product, it has been found that more palladium catalyst is generally required to obtain optimum yields. When it is desired to produce polyphenoxy ethers, the reaction mixture should generally contain an amount of palladium catalyst equal to form about 0.2% to about 0.7% by weight based on the weight of alkylphenol employed. Here, also, additional catalyst may be utilized if desired.

Alkaline material

In accordance with the present invention, it has been found that satisfactory products can be produced utilizing less catalyst or, when the same amount of catalyst is employed, the yield of product can be improved, by also including an alkaline material in the reaction mixture. The alkaline material useful in achieving the improved results of the present invention is selected from the group consisting of alkali metal hydroxides, alkali metal carbonates, and alkali metal bicarbonates. The alkaline material may be added either as a single compound or as a mixture of compounds.

When it is desired to produce diphenoquinones, any of the above-mentioned alkaline materials may be utilized. In producing the diphenoquinones, it has been found that to produce optimum results the amount of alkaline material should be equal to about 0.1% by weight based on the weight of alkylphenol employed. Either more than or less than this amount of alkaline material may be included in the reaction mixture if desired. However, the use of more alkaline material has not been found to significantly increase the yield of diphenoquinone and it is, therefore, not generally desirable to include additional material in the reaction mixture. Also, although some diphenoquinone is produced when less alkaline material is utilized, this is generally not desirable.

In preparing polyphenoxy ethers in accordance with the present invention, a distinction must be drawn depending upon whether the desired product is the low molecular weight polyphenoxy ether, referred to above, or whether other polyphenoxy ethers are desired. If low molecular weight polyphenoxy ethers are desired, either an alkali metal hydroxide or an alkali metal carbonate may be added to the reaction mixture. However, if it is desired to produce polyphenoxy ethers of a higher average molecular weight, only an alkali metal hydroxide should be utilized. Here also, the amount of alkaline material has not been found to be narrowly critical to the production of products in accordance with the present invention. However, the amount of alkaline material required to produce optimum yields is generally equal to or greater than that required to produce the optimum yield of diphenoquinone. It has been found that, in most instances, an amount of alkaline material equal to about 0.3% by weight based on the weight of alkylphenol present in the reaction mixture will produce an optimum yield of the polyphenoxy ether. As in the case of the diphenoquinones, either less than, or more than, this amount may also be utilized. However, especially in those cases when no water is included in the reaction mixture; i.e., when high molecular weight products are desired, an excessive amount of alkaline material should not be utilized. If too much alkaline material is utilized in these situations, problems such as stirring, etc., may be encountered. The alkaline material may be added to the reaction mixture either alone or combined with the palladium catalyst.

The reaction mixture comprising alkylphenol, solvent, palladium catalyst, and alkaline material is contacted with a suitable oxidizing agent to convert the alkylphenol to the desired product. Oxidizing agents which may be employed in carrying out the present invention include oxygen either alone or as an oxygen-containing gas, such as air. The oxygen may be introduced into the reaction mixture either directly as oxygen gas or as an oxygen-generating material such as ozone, hydrogen peroxide, or an organic peroxide. The amount of oxygen utilized should be sufficient to convert all of the alkylphenol to the desired product. To assure that sufficient oxygen is present, oxygen should be introduced into the reaction mixture continuously during the course of the reaction.

The reaction conditions employed may be varied depending upon the product desired. If diphenoquinones are the principal product being prepared, it is preferred to heat the reaction mixture to a temperature in the range of from about 40° C. to about 70° C. However, when it is desired to produce primarily the polyphenoxy ethers, the reaction is preferably conducted at a lower temperature, generally in the range of from about 10° C. to about 20° C. It has been found that the higher molecular weight products are best produced at lower temperatures and that raising the reaction temperature tends to lower the molecular weight of the resulting polyphenoxy ethers. Temperatures other than those mentioned above may be employed. However, conversion to the desired product is generally reduced if the reaction is conducted at such temperatures. The amount of time required for completion of the reaction depends on the temperature employed and the other variables such as the concentration of alkylphenol, the amount of catalyst, and the amount of alkaline material employed. However, it has been found that, in general, the reaction is completed in 6 hours or less.

As will be appreciated by those skilled in the art, the process of the present invention frequently results in the production of a mixture of products. Thus, when a diphenoquinone is produced, there may also be included in the product some low molecular weight polyphenoxy ethers. These latter products may be separated and the diphenoquinone purified by procedures which are now well known in the art. These procedures generally take advantage of the fact that the diphenoquinone is soluble in materials in which the low molecular weight product will not dissolve and vice versa. Similarly, when polyphenoxy ethers are prepared, there may result a mixture of products having a variety of average molecular weights. These may also be separated, if desired, as is known to those skilled in the art. This also is done by taking advantage of the relative solubility and insolubility of the several fractions.

The following procedure is representative of those which may be utilized to isolate and separate the products produced in accordance with the present invention.

If a solvent such as an aromatic hydrocarbon is employed, the diphenoquinone will precipitate during the course of the reaction. The solids are filtered from the reaction mixture and washed with an organic solvent such as benzene or xylene to remove any unreacted alkylphenol or low molecular weight polyphenoxy ether. The solid diphenoquinone is then separated from the catalyst by extracting with a suitable solvent, such as methylene chloride, followed by evaporation of the solvent. The lower molecular weight polyphenoxy ethers are soluble in aromatic hydrocarbons and may be precipitated therefrom by the addition of methanol or acetone. The higher molecular weight polyphenoxy ethers are soluble in, for example, toluene, benzene, and chloroform and may be precipitated by the addition of a second solvent in which they are insoluble such as acetone or methanol.

If desired, the diphenoquinone/catalyst mixture may be hydrogenated directly to produce the corresponding biphenol. In such a case, the diphenoquinone/catalyst mixture was removed from the reaction mixture by filtration, slurried in a suitable solvent such as methanol, and hydrogen was introduced at an elevated temperature until the red color of the diphenoquinone disappeared.

In order to describe the present invention so that it may be more clearly understood, the following examples are set forth. These examples are given primarily for the purpose of illustration and any enumeration of detail contained therein should not be interpreted as a limitation on the concept of the present invention.

As used herein, the term mol percent refers to:

$$\frac{\text{mols of product (actual)}}{\text{mols of product (theoretical)}} \times 100$$

Examples 1 through 8 are intended to illustrate the preparation of diphenoquinones by the process of the present invention.

EXAMPLE 1

Into a 500-ml., creased Morton flask, fitted with a gas addition tube, a condenser, a thermometer and a stirrer capable of operating at speeds in the range of from about 8,000 to about 10,000 r.p.m., there was added 48.8 grams of 2,6-xylenol dissolved in 125 ml. of xylene. There was then added 175 ml. of water containing 1.0 ml. of a 4.5 N solution of sodium hydroxide and 1.0 grams of a palladium-carbon catalyst containing 5% by weight palladium. The amount of alkaline material added was equal to 0.37% by weight and the amount of palladium was equal to 0.10%.

The reaction mixture was heated to a temperature of 40° C. and a slow stream of oxygen which had been purified by passing through sodium hydroxide pellets, BPL charcoal and concentrated sulfuric acid was introduced. After about 20 minutes, diphenoquinone began to form, as evidenced by the appearance of a red color in the reaction mixture. At the end of 6 hours, all of the 2,6-xylenol had been reacted, as evidenced by GLC analysis of a sample removed from the reaction mixture. A this time, the reactor was flushed with nitrogen and cooled to a temperature of 20° C.

The reaction mixture was filtered through a medium porosity, sintered-glass funnel under slight vacuum to remove a purplish-red solid. The solid was washed twice with 25 ml. portions of benzene and air dried. When dried, the solid was placed in a Soxhlet thimble and extracted with methylene chloride until the extracts were a very pale yellow color. The methylene chloride was then removed, resulting in 31 grams of a solid product. The product was further purified by stirring with a mixture of methanol, water and sodium hydroxide, filtering and washing the solid with water until the pH of the filtrate was approximately neutral. There resulted 30 grams of tetramethyl diphenoquione.

EXAMPLE 2

Into the reaction flask described in Example 1, there was added 24.4 grams of 2,6-xylenol dissolved in 75 ml. of xylene. There was then added 145 ml. of water containing 4.2 millimols of sodium hydroxide and 2.0 grams of a palladium-carbon catalyst containing 5% by weight palladium. The amount of NaOH added was equal to 0.69% by weight based on the weight of the xylenol and the palladium was equal to 0.41% by weight.

The reaction mixture was heated to a temperature of 40° C. for 5 hours during which time oxygen was introduced as in Example 1. At the end of this time, all of the 2,6-xylenol had reacted. The yield of tetramethyl diphenoquinone, isolated as described in Example 1, was equal to 10 grams.

EXAMPLE 3

Into the reaction flask described in Example 1, there was added 48.8 grams of 2,6-xylenol dissolved in 125 ml. of 1,2,4-trimethylbenzene. There was then added to the reaction mixture 125 ml. of water containing 4.3 millimols of sodium hydroxide and 1.0 grams of a palladium-carbon catalyst containing 5% by weight palladium. The amount of sodium hydroxide added was equal to 0.35% by weight based on the weight of the xylenol and the palladium was equal to 0.10% by weight.

The resulting reaction mixture was heated to a temperature of 70° C. and oxygen was introduced, also as described in Example 1. At the end of 6 hours, 40 grams of tetramethyl diphenoquinone were recovered as described in Example 1.

EXAMPLE 4

Into a reaction flask as described in Example 1, there was added 48.8 grams of 2,6-xylenol dissolved in 125 ml. of xylene. There was then added 175 ml. of water containing 4.3 millimols of sodium hydroxide (0.35% by weight) and 0.5 grams of a palladium-carbon catalyst containing 10% by weight palladium (0.10% by weight).

The resulting reaction mixture was heated to 40° C. and oxygen was introduced as in Example 1 for 6 hours. At the end of this time, 19 grams of tetramethyl diphenoquinone were isolated as in Example 1.

EXAMPLE 5

Several samples, identified as A through E in Table 1, were prepared by first dissolving 48.8 grams (400 millimols) of 2,6-xylenol in 125 ml. of xylene in a reaction flask as described in Example 1. To each sample there was then added 1.0 gram of a palladium-carbon catalyst containing 5% by weight palladium and 175 ml. of water having dissolved therein varying amounts of sodium hydroxide as indicated in Table 1. The resulting reaction mixture was heated to 40° C. and oxygen was introduced as in Example 1. At the end of 6 hours, the reaction was stopped and the products isolated. The results are given in Table 1.

TABLE 1

| Sample | NaOH added— Grams | NaOH added— Percent by weight | Unreacted xylenol (percent of charge) | After 6 hours polyphenoxy ether mol percent | Diphenoquinone (mol percent) |
|---|---|---|---|---|---|
| A | 0 | | 42 | 0 | 49 |
| B | .086 | 0.17 | 14 | 1.3 | 62.5 |
| C | .172 | 0.35 | 0 | 8.0 | 65.0 |
| D | .672 | 1.37 | 2 | 37.2 | 50.3 |
| E | 1.376 | 2.82 | 0 | 35.4 | 57.5 |

EXAMPLE 6

Into a reaction flask as described in Example 1, there was added 48.8 grams of 2,6-xylenol dissolved in 125 ml. of xylene. There was then added 175 ml. of water containing 4.3 millimols of sodium carbonate (0.93 by weight) and 1.0 gram of a palladium-carbon catalyst containing 5% by weight palladium (0.10% by weight).

The resulting reaction mixture was heated to 40° C. and oxygen was introduced, as in Example 1, for 6 hours. At the end of this time, the tetramethyl diphenoquinone was isolated, also as in Example 1. The yield of diphenoquinone was equal to 61.5 mol percent. By comparison, a control run without the addition of sodium carbonate resulted in the preparation of the diphenoquinone in an amount equal to 49 mol percent.

EXAMPLE 7

The procedure of Example 6 was repeated except that the sodium carbonate employed therein was replaced with 4.3 millimols of sodium bicarbonate (0.74% by weight). The resulting yield of tetramethyl diphenoquinone was equal to 56.0 mol percent.

EXAMPLE 8

Into a reaction flask as described in Example 1, there was added 20.6 grams (100 millimols) of 2,6-di-t-butylphenol dissolved in 125 ml. of xylene. There was then added 175 ml. of water containing 4.2 millimols of sodium hydroxide (0.82% by weight) and 1.0 grams of a palladium-carbon catalyst containing 5% by weight palladium (0.242% by weight).

The resulting reaction mixture was heated to 40° C. and oxygen was introduced as in Example 1. At the end of 3 hours, all of the phenol had reacted. The yield of diphenoquinone isolated as in Example 1 was equal to 74 mol percent. By comparison, a sample run without the sodium hydroxide required 5 hours for all of the phenol to react.

The remaining examples are intended to illustrate the preparation of polyphenoxy ethers in accordance with the invention. Examples 9 through 12 illustrate the preparation of low molecular weight ethers. Examples 13 through 16 illustrate the preparation of intermediate molecular weight ethers and the remaining examples are representative of the method of preparing high molecular weight polyphenoxy ethers in accordance with the present invention.

EXAMPLE 9

Into the reaction flask described in Example 1, there was added 48.8 grams of 2,6-xylenol dissolved in 280 ml. of xylene. There was then added 20 ml. of water and 1.0 ml. of 4.3 N solution of sodium hydroxide. To the resulting mixture, there was finally added 4.0 grams of a palladium-carbon catalyst containing 5% by weight palladium. The amount of sodium hydroxide added was equal to 0.35% by weight based on the weight of the xylenol and the palladium was equal to 0.41% by weight.

The resulting reaction mixture was maintained at a temperature of 20° C. and oxygen was introduced as described in Example 1. At the end of 6 hours, all of the 2,6-xylenol had been reacted. At this time, the reaction mixture was filtered to remove any solids, including diphenoquinone, which had formed; the solids were washed with xylene; and the xylene was poured into a stirred solution of methanol to precipitate the polymer. The yield of polymer was equal to 78 mol percent.

EXAMPLE 10

Into the reaction flask described in Example 1, there was added 48.8 grams of 2,6-xylenol dissolved in 100 ml. of xylene. There was then added 6.4 millimols of solid potassium hydroxide (0.73% by weight) and 2.0 grams of a palladium on carbon catalyst containing 5% by weight palladium (0.205% by weight).

After reaction for 6 hours at 20° C., the resulting polymer was isolated as in Example 9. The yield of polymer was equal to 76 mol percent.

EXAMPLE 11

Into the reaction flask described in Example 1, there was added 48.8 grams of 2,6-xylenol dissolved in 100 ml. of xylene. There was then added 6.4 millimols of solid potassium hydroxide (0.73% by weight) and 4.0 grams of a palladium on carbon catalyst containing 2% by weight palladium (0.164% by weight).

After reaction for 6 hours at 20° C., the resulting polymer was isolated as in Example 9. The yield of polymer was equal to 65 mol percent.

EXAMPLE 12

Into the reaction flask described in Example 1, there was added 21.6 grams (200 millimols) of o-cresol dissolved in 75 ml. xylene. There was then added 145 ml. of water containing 4.2 millimols of sodium hydroxide (0.78% by weight) and 2.0 grams of a palladium-carbon catalyst containing 5% by weight palladium (0.463% by weight).

The resulting reaction mixture was heated to 40° C. and oxygen was introduced as in Example 1. At the end of 6 hours, the yield of low molecular weight polyphenoxy ether was equal to 45 mol percent. By comparison, a second sample run without the sodium hydroxide resulted in a yield of low molecular weight polyphenoxy ether equal to 30 mol percent.

EXAMPLE 13

Into the reaction flask described in Example 1, there was added 48.8 grams of 2,6-xylenol dissolved in 250 ml. of xylene. There was then added 5.4 millimols of solid potassium hydroxide (0.62% by weight) and 4.0 grams of a palladium on carbon catalyst containing 5% by weight palladium (0.41% by weight).

The resulting reaction mixture was maintained at a temperature of 20° C. and oxygen was introduced as described in Example 1. At the end of 6 hours, the resulting intermediate molecular weight polyphenoxy ether was isolated by pouring the xylene solution into a stirred acetone solution to precipitate the polymer. The yield of polymer was equal to 66 mol percent.

EXAMPLE 14

Into the reaction flask described in Example 1, there was added 48.8 grams of 2,6-xylenol dissolved in 280 ml. of xylene. There was then added 4.3 millimols of solid sodium hydroxide (0.35% by weight) and 4.0 grams of a palladium-carbon catalyst containing 5% by weight palladium (0.41% by weight).

The resulting reaction mixture was maintained at a temperature of 20° C. and oxygen was introduced as described in Example 1. At the end of 6 hours, the polyphenoxy ether was isolated as in Example 13. The yield of polymer was equal to 62 mol. percent. By comparison, a second sample run without the sodium hydroxide produced none of the intermediate molecular weight polyphenoxy ether.

EXAMPLE 15

Into the reaction flask described in Example 1, there was added 48.8 grams of 2,6-xylenol dissolved in 200 ml. of xylene. There was then added 3.2 millimols of solid potassium hydroxide (0.37% by weight) and 4.0 grams of a palladium-carbon catalyst containing 5% by weight palladium (0.41% by weight).

The resulting reaction mixture was maintained at 20° C. and oxygen was introduced as described in Example 1. At the end of 2½ hours, the temperature was raised to 30° C. and oxygen was introduced at this temperature for 3 hours. Finally, the temperature was 45° C. for ½ hour. At the end of this time (total of 6 hours), the intermediate molecular weight product was isolated as in Example 13. The yield of produce was equal to 64 mol percent.

EXAMPLE 16

Into the reaction flask described in Example 1, there was added 48.8 grams of 2,6-xylenol dissolved in 100 ml. of xylene. There was then added 3.2 millimols of solid potassium hydroxide (0.37% by weight) and 4.0 grams of a palladium-carbon catalyst containing 5% by weight palladium (0.41% by weight).

The resulting reaction mixture was maintained at 10° C. and oxygen was introduced as in Example 1. At the end of 6 hours, the polymer was isolated by filtering the reaction mixture to remove the catalyst and any solids contained therein and adding the filtrate to acetone to precipitate the intermediate molecular weight polyphenoxy ether. The yield of the desired product was equal to 62 mol percent. The product melted at a temperature between 230° C. and 240° C.

EXAMPLE 17

Into the reaction flask described in Example 1, there was added 48.8 grams of 2,6-xylenol dissolved in 200 ml. of xylene. There was then added 3.2 millimols of potassium hydroxide (0.37% by weight) and 4.0 grams of a palladium-carbon catalyst containing 5% by weight palladium (0.41% by weight).

The resulting reaction mixture was maintained at 20° C. and oxygen was introduced as described in Example 1. At the end of 6 hours, the polymer was isolated by filtering the reaction mixture to remove a solid fraction containing the desired product, washing the solids with xylene and methanol, extracting with chloroform in which the high molecular weight polymer is soluble, and pouring the chloroform solution into methanol to precipitate the product. The yield of high molecular weight polyphenoxy ether was equal to 47 mol percent.

By comparison, a second sample, identical to that described above, except that the potassium hydroxide was replaced with 9.6 millimols of powdered sodium hydroxide, was prepared and reacted as above. The resulting yield of high molecular weight product was equal to 42 mol percent. A third sample run without the addition of any alkaline material produced none of the high molecular weight polyphenoxy ether.

EXAMPLE 18

Into the reaction flask described in Example 1, there was added 48.8 grams of 2,6-xylenol dissolved in 200 ml. of xylene. There was then added 6.4 millimols of solid potassium hydroxide (0.73% by weight) and, after 10 minutes, 20 grams of a palladium-carbon catalyst containing 1% by weight palladium (0.41% by weight).

The resulting reaction mixture was maintained at 20° C. and oxygen was introduced as in Example 1. After 6 hours, the high molecular weight polyphenoxy ether was isolated as described in Example 17. The yield of this polymer was equal to 66 mol percent.

By comparison, a second sample run without the addition of any potassium hydroxide did not yield any high molecular weight polyphenoxy ether.

EXAMPLE 9

Several samples, identified as A through G in Table 2, were prepared by adding varying amounts of potassium hydroxide to 100 ml. of xylene contained in the reaction flask described in Example 1. There was then added 48.8 grams of 2,6-xylenol and the resulting mixture was stirred for ½ hour. At the end of this time, there was added 4.0 grams of a palladium-carbon catalyst containing 5.0% by weight palladium (0.41% by weight).

The resulting reaction mixture was maintained at 20° C. and oxygen was introduced as described in Example 1. At the end of 6 hours, the high molecular weight polyphenoxy ether was isolated as in Example 17. The yield of high molecular weight product obtained from each sample is also given in Table 2.

TABLE 2

| Sample | KOH added— | | High molecular weight ether (mol percent) |
|---|---|---|---|
| | Millimols | Percent by weight | |
| A | 0 | | 0 |
| B | 1.6 | 0.18 | 60 |
| C | 3.2 | 0.37 | 57 |
| D | 6.4 | 0.73 | 65 |
| E | 12.8 | 1.45 | 71 |
| F | 25.6 | 2.94 | 57 |
| G | 38.4 | 4.41 | 50 |

What is claimed is:

1. In a method of preparing a condensation product of an alkylphenol, said method comprising contacting a solution of the alkylphenol with oxygen in the presence of a palladium catalyst, the improvement which comprises adding to the solution an alkaline material selected from the group consisting of alkali metal hydroxides, alkali metal carbonates, and alkali metal bicarbonates.

2. A method, as claimed in claim 1, wherein the palladium catalyst contains an activated carbon carrier.

3. A method, as claimed in claim 1, wherein the alkylphenol is selected from the group consisting of 2,6-dialkylphenols and monoalkylphenols.

4. A method, as claimed in claim 3, wherein the alkyl group of the alkylphenol contains from 1 to about 5 carbon atoms.

5. A method, as claimed in claim 1, wherein the alkylphenol is dissolved in an aromatic hydrocarbon.

6. A method, as claimed in claim 5, wherein the aromatic hydrocarbon is xylene.

7. A method, as claimed in claim 1, wherein the condensation product is a diphenoquinone prepared from a 2,6-dialkylphenol.

8. A method, as claimed in claim 7, wherein the dialkylphenol is 2,6-xylenol.

9. A method, as claimed in claim 7, wherein the amount of alkaline material is equal to about 0.1% by weight based on the weight of alkylphenol in the solution.

10. A method, as claimed in claim 7, wherein the amount of catalyst is equal to from about 0.02% to about 0.5% by weight based on the weight of dialkylphenol in the solution.

11. A method, as claimed in claim 7, wherein the reaction is carried out at a temperature of from about 40° C. to about 70° C.

12. A method, as claimed in claim 7, wherein the alkylphenol solution comprises an aromatic hydrocarbon and water.

13. A method, as claimed in claim 12, wherein the amount of water employed is equal to from about 200 ml. to about 1,400 ml. per liter of aromatic hydrocarbon.

14. A method, as claimed in claim 1, wherein the condensation product is a polyphenoxy ether prepared from a 2,6-dialkylphenol or a monoalkylphenol in the presence of an alkaline material selected from the group consisting of alkali metal hydroxides and alkali metal carbonates.

15. A method, as claimed in claim 14, wherein the amount of alkaline material is equal to about 0.3% by weight based on the weight of alkylphenol in the solution.

16. A method, as claimed in claim 14, wherein the amount of catalyst is equal to from about 0.2% to about 0.7% by weight based on the weight of alkylphenol in the solution.

17. A method, as claimed in claim 14, wherein the polyphenoxy ether is prepared from a 2,6-dialkylphenol in the presence of an alkali metal hydroxide.

References Cited
UNITED STATES PATENTS 3,555,052   1/1971   Yonemitsu et al. __ 260—396 N VIVIAN GARNER, Primary Examiner U.S. Cl. X.R.

260—47 ET, 613 R, 620

UNITED STATES PATENT OFFICE
CERTIFICATE OF CORRECTION

PATENT NO. : 3,804,865
DATED : April 16, 1974
INVENTOR(S) : Thomas F. Rutledge

It is certified that error appears in the above-identified patent and that said Letters Patent are hereby corrected as shown below:

Column 3, line 69, "form" should read -- from --.

Column 7, line 30, "(0.93 by" should read -- (0.93% by --.

Column 10, line 11, "EXAMPLE 9" should read -- EXAMPLE 19 --.

Table 2, "Millimols" should read -- (Millimols) --.

Table 2, "Percent by weight" should read -- (Percent by weight) --.

Signed and Sealed this fourth Day of November 1975

[SEAL]

Attest:

RUTH C. MASON
Attesting Officer

C. MARSHALL DANN
Commissioner of Patents and Trademarks